United States Patent
Sweere et al.

(10) Patent No.: US 9,678,551 B2
(45) Date of Patent: Jun. 13, 2017

(54) APPARATUS AND METHOD FOR VISUAL FIELD REPLACEABLE UNIT IDENTIFICATION IN THE ABSENCE OF HOST SYSTEM DEVICE POWER

(71) Applicant: Sanmina Corporation, San Jose, CA (US)

(72) Inventors: Paul Sweere, San Clemente, CA (US); Jayantilal R. Patel, San Diego, CA (US); Irfan Syed, Mission Viejo, CA (US)

(73) Assignee: SANMINA CORPORATION, San Jose, CA (US)

( * ) Notice: Subject to any disclaimer, the term of this patent is extended or adjusted under 35 U.S.C. 154(b) by 33 days.

(21) Appl. No.: 14/794,764

(22) Filed: Jul. 8, 2015

(65) Prior Publication Data

US 2016/0011927 A1    Jan. 14, 2016

Related U.S. Application Data

(60) Provisional application No. 62/021,900, filed on Jul. 8, 2014.

(51) Int. Cl.
*G06F 11/07* (2006.01)
*G06F 1/26* (2006.01)
*G06F 11/00* (2006.01)

(52) U.S. Cl.
CPC ............. *G06F 1/266* (2013.01); *G06F 1/263* (2013.01); *G06F 11/006* (2013.01)

(58) Field of Classification Search
CPC ............. G06F 11/2028; G06F 11/2094; G06F 11/1417; G06F 11/0727; G06F 11/2015; G06F 3/0689; G06F 3/0634; G06F 3/0625
See application file for complete search history.

(56) References Cited

U.S. PATENT DOCUMENTS

| | | | |
|---|---|---|---|
| 7,315,251 B1 * | 1/2008 | Holland | G06F 1/181 340/635 |
| 7,568,122 B2 * | 7/2009 | Mechalke | G06F 11/0727 714/46 |
| 9,116,263 B2 * | 8/2015 | Hayden, Sr. | G02B 6/0008 |
| 9,304,581 B1 * | 4/2016 | Robillard | G06F 3/06 |
| 2006/0212752 A1 * | 9/2006 | Mechalke | G06F 11/0727 714/47.3 |

* cited by examiner

*Primary Examiner* — Nadeem Iqbal
(74) *Attorney, Agent, or Firm* — Loza & Loza, LLP; Julio M. Loza; Heidi L. Eisenhut

(57) ABSTRACT

The present disclosure is directed to visual field replacement unit (FRU) identification and retaining FRU status information of one or more field replaceable units in a host system device when one or more of the field replaceable units is removed from the host system device disconnecting host power to the removed field replaceable unit(s). The one or more field replaceable units may be located on a carrier printed circuit board assembly and the host system device may contain multiple field replaceable units and/or multiple carrier printed circuit board subassemblies. Once the host power is disconnected from the carrier, an alternate power source continues to provide power to keep the FRU indicator illuminated for repairs or replacement. The FRU indicator is illuminated long enough for a service technician to place the carrier on a bench or table top and recognize the failed FRU from the remaining FRUs.

20 Claims, 4 Drawing Sheets

US 9,678,551 B2

APPARATUS AND METHOD FOR VISUAL FIELD REPLACEABLE UNIT IDENTIFICATION IN THE ABSENCE OF HOST SYSTEM DEVICE POWER

CLAIM OF PRIORITY

The present Application for Patent claims priority to U.S. Provisional Application No. 61/917,262 entitled "Apparatus and Method for Visual Field Replaceable Unit Identification in the Absence of Host System Power", filed Jul. 8, 2014, which is hereby expressly incorporated by reference.

FIELD

Various features relate to improvements to visual field replacement unit (FRU) identification, such as retaining FRU status information in the absence of host power, illuminating a FRU indicator in the absence of host power, and preserving energy storage in an alternate power source.

BACKGROUND

Enterprise server and storage systems are deployed in business critical applications. As such, minimizing system downtime in the event of a component or subsystem failure is critical to minimizing financial impact to the enterprise. Thus, it is beneficial to aid a repair technician by providing a dedicated visual indicator associated with a failed component or subsystem, so that the component or subsystem, known as a "field replaceable unit" or "FRU", can be quickly located and replaced. To avoid ambiguity and minimize the chance of the repair technician replacing the wrong FRU, it is beneficial to place the visual FRU indicator as physically close to the FRU as possible.

In today's server and storage systems, light emitting diodes (LEDs) are typically used as FRU indications. For example, in a storage array containing several hard drives, there may be a hard drive failure LED indicator associated with each hard drive visible to the service technician on the front panel of the array. When the host system device detects that a hard drive has failed, the host system device illuminates the associated failure LED so a service technician knows which hard drive to replace. However, in these systems, host power is required to energize the circuitry which will illuminate the LED.

In some systems, the FRU to be replaced may be embedded inside of a system or subsystem that needs to be removed from a host system device in order to gain physical access to the FRU. In these cases, it may not be possible to provide power to the FRU LED because the FRU and associated subassembly have been physically removed from the host system device, and as a result have lost the power connection to the host system device. Consequently, there is no power to illuminate the appropriate FRU LED.

In view of the above, a more effective way of locating a failed FRU, for example in a bank of FRUs, is needed. Furthermore, when a failed FRU is detached from its host power source, the FRU status information becomes lost and as such, a way of preserving the FRU status information when the power connection with the host system device is removed is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a device for visual field replacement unit identification is provided. The device includes a storage circuit, a power multiplexer/isolation circuit and an alternate power source. The storage circuit stores status bits indicating a status of each field replacement unit in a plurality of field replacement units. The power multiplexer/isolation circuit is coupled to the storage circuit and a power source for supplying power to the storage circuit during runtime and updates the status of the each field replacement unit in the plurality of field replacement units. The alternate power source is coupled to the power multiplexer/isolation circuit to power the storage circuit when the storage circuit is disconnected from the main power source. When the alternative power source is activated for illumination, the alternate power source illuminates an indicator of one or more failed field replaceable units in the plurality of field replacement units.

According to one aspect, the alternate power circuit includes one or more supercapacitors having a capacitance in the range of 1-10 Farads.

According to another aspect, the storage circuit may be a microcontroller-based circuit having a non-volatile memory.

According to yet another aspect, the plurality of field replacement units are located on one or more carrier printed circuit board assemblies.

According to yet another aspect, the device for visual field replacement unit identification may further include a push-button switch for activating the alternate power source to power the microcontroller-based circuit to assert a control signal to illuminate the one or more indicators of the failed field replaceable unit.

According to yet another aspect, the storage circuit may be a latch integrated circuit (IC).

According to yet another aspect, the status of the each replacement unit in the plurality of field replacement units is updated in real time.

According to one aspect, the status of the each field replacement unit in the plurality of field replacement units is updated upon a detection of a failure in at least one field replaceable unit in the plurality of field According to another feature, a method, operational on a host system device, for visual field replacement unit identification is provided. The method includes storing status bits in a storage circuit indicating a status of one or more field replacement units; coupling a power multiplexer/isolation circuit to the storage circuit and a main power source for supplying power to the storage circuit during runtime, updating the status of the one or more field replacements units; and coupling an alternate power source to the power multiplexer/isolation circuit to power the storage circuit when the storage circuit is disconnected from the main power source, wherein when activated for illumination, the alternate power source illuminates one or more indicators indicating one or more failed field replaceable units in the one or more field replacement units.

According to one aspect, the alternate power circuit includes one or more supercapacitors having a capacitance in a range of 1-10 Farads.

According to yet another aspect, the storage circuit is a microcontroller-based circuit having a non-volatile memory which stores the status bits.

According to yet another aspect, the one or more field replacement units are located on one or more carrier printed circuit board assemblies.

According to yet another aspect, the method further includes enabling a pushbutton switch to activate the alternate power source to power the microcontroller-based circuit to assert a control signal to illuminate the one or more indicators of the failed field replaceable unit in the one or more field replaceable units.

According to yet another aspect, the storage circuit is a latch integrated circuit (IC).

According to yet another aspect, the method further includes enabling a pushbutton switch to activate the alternate power source to illuminate the one or more indicators to identify the one or more failed field replaceable units.

According to yet another aspect, the status of the one or more field replacement units is updated in real time.

According to yet another aspect, the status of the one or more field replaceable units is updated upon a detection of one or more failures in the one or more field replaceable units.

According to yet another feature, a host system device is provided. The device includes one or more field replaceable units powered by a host power source. Each field replaceable unit includes a storage circuit for storing status information associated with the one or more field replaceable units; an on-board backup power source to power the storage circuit when the storage circuit is disconnected from the host power source, and a circuit powered by the on-board backup power source and adapted to provide one or more visual indicators of status information stored in the storage circuit.

According to another aspect, the one or more visual indicators are provided as one or more light emitting diodes.

According to yet another aspect, the one or more field replaceable units are removably coupled the host system device.

According to yet another aspect, the storage circuit is non-volatile storage.

According to yet another aspect, the one or more field replacement units are located on one or more carrier printed circuit board assemblies.

According to yet another aspect, at least one of the one or more field replaceable units includes one or more non-volatile storage devices, and the status information stored in the storage circuit corresponds to the status of the one or more non-volatile storage devices.

According to yet another aspect, the status information includes at least one of: device failure, device usage, and errors for the one or more non-volatile storage devices.

According to yet another aspect, the circuit operates while the field replaceable unit is removed from the host system device.

According to yet another aspect, the circuit is activated and powered from the on-board backup power source by manual activation.

DETAILED DESCRIPTION

Figure 1:
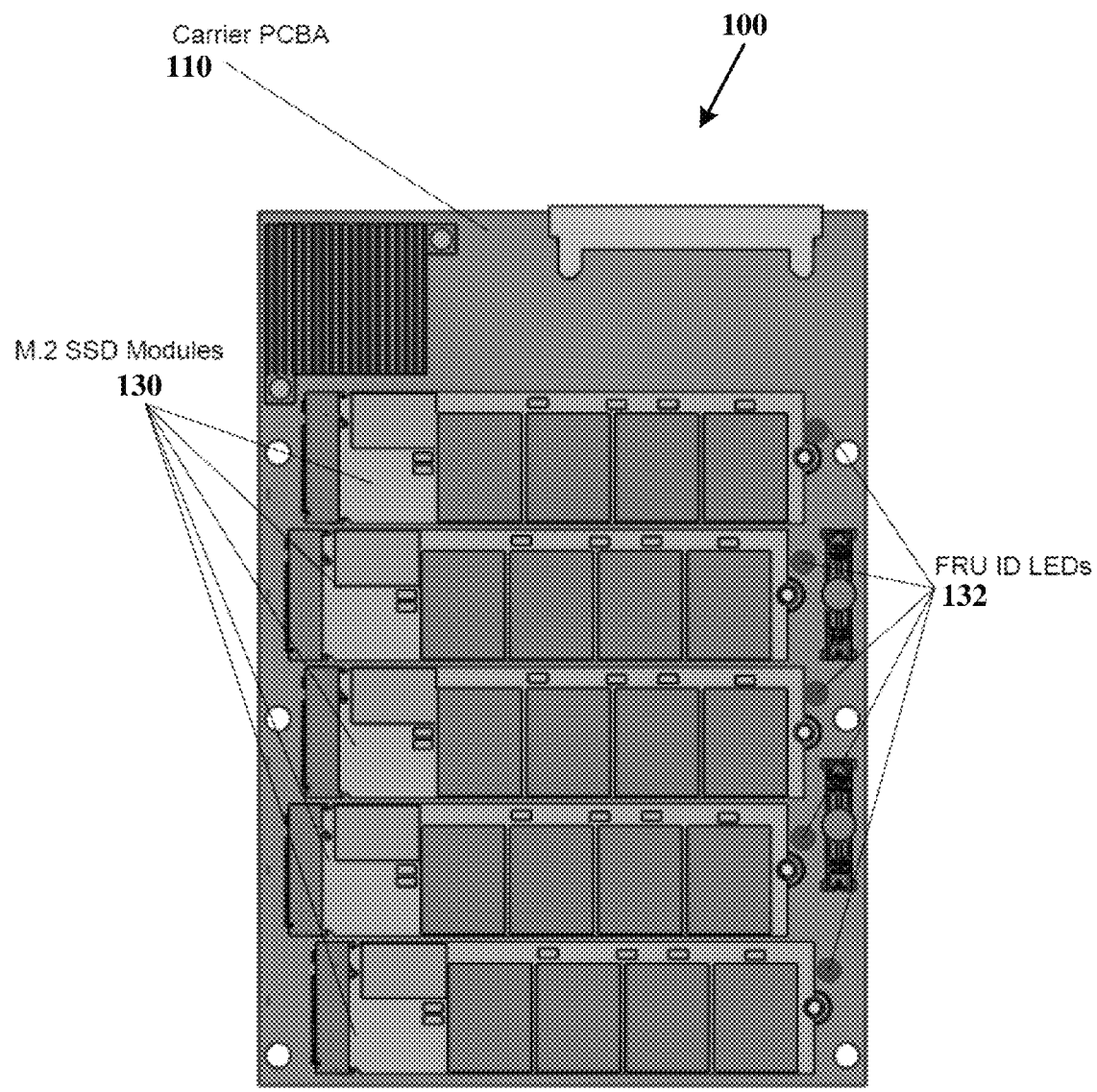
FIG. 1 illustrates an example of multiple M.2 SSD Modules located within a carrier Printed Circuit Board Assembly (PCBA).

In the following detailed description, numerous specific details are set forth in order to provide a thorough understanding of the different aspects. However, it will be understood by one of ordinary skill in the art that the different aspects may be practiced without these specific details. For example, well-known operations, structures and techniques may not be shown in detail in order not to obscure the different aspects presented herein.

In the following description, certain terminology is used to describe certain features of one or more embodiments. The term "field replaceable unit" may refer to a circuit, circuit board, part, device, hardware module (such as a flash memory module, solid state drive, interface card, storage component, etc.), component or assembly that can be quickly and easily removed from a computer or other piece of electronic equipment, and replaced by the user or a technician without having to send the entire product or system to a repair facility. The term "carrier" may refer to a carrier printed circuit board assembly having one or more field replaceable units and a separate indicator associated with a different field replaceable unit.

Overview

The present disclosure is directed to visual field replacement unit (FRU) identification and retaining FRU status information of one or more field replaceable units in a host system device when one or more of the field replaceable units is removed from the host system device disconnecting power to the removed field replaceable unit(s). According to one aspect, the one or more field replaceable units may be located on a carrier printed circuit board assembly or simply "carrier". Furthermore, a host system device may contain multiple field replaceable units and multiple carrier printed circuit board subassemblies.

According to one aspect, an alternative power source, such as a supercapacitor energy storage, may be used on the carrier or directly on the field replaceable unit to retain FRU status information in the absence of host power.

According to one aspect, visual FRU identification (ID) on a subsystem assembly is provided where visual FRU identification would have only been possible after the subassembly is removed from its host system device due to the FRUs being visually obstructed while inside the host system device. As describe above, a field replaceable unit may be a component or subsystem (e.g., flash memory module, solid state drive, interface card, storage component, etc.) removably/replaceably coupled to a host system device.

According to one aspect, a pushbutton switch may be used to preserve energy stored in the alternate power source, e.g., the supercapacitor, until power is needed.

To avoid ambiguity and to minimize the chance of replacing or repairing the wrong FRU, it may be beneficial to place a visual FRU indicator as physically close as possible to the failed FRU.

In one example, light emitting diodes (LEDs) may be used as FRU indicators. For example, in a storage array containing several hard drives (e.g., a bank of hard drives), there may be a hard drive failure indicator, such as an LED indicator, associated with each hard drive visible to the service technician on the front panel of the storage array. When the host system device detects that a particular hard drive has failed, the host system device illuminates the failure indicator, e.g. the LED indicator, associated with the failed hard drive. With such an indication, a service technician is alerted as to which hard drive to replace in the midst of the bank of hard drives. In these sorts of systems, host power needs to be available to energize the circuitry which will illuminate the LED. One skilled in the art would understand that other types of indicators (other than LEDs) may be used within the spirit and scope of the present disclosure.

In some systems, the FRU to be replaced may be embedded inside of a system or subsystem that needs to be removed from a host system device in order to gain physical access to the FRU. In these cases, it may not be possible to provide electrical power to the FRU LED, because the FRU and associated subassembly have been physically removed from the host system device, and therefore, has lost the power connection to the host system device. Thus, there is no power to illuminate the appropriate FRU LED.

In one example, a system may include a subsystem which contains several solid state drive (SSD) M.2 modules. M.2 is an industry standard SSD form factor. These M.2 modules plug into a carrier. Main power for the carrier and M.2 modules are derived from the host system device and are only available when the carrier is plugged into the host system device.

In this example, the M.2 module is defined as a FRU. The system may include FRU identification LEDs for each M.2 module located on the carrier (e.g., multiple modules such as 5 modules). FIG. 1 illustrates an example 100 of multiple M.2 SSD Modules 130 located within a carrier Printed Circuit Board Assembly (PCBA) 110. In the example of FIG. 1, the FRU LEDs 132 are located physically close to their respective M.2 SSD modules 130.

In one example, when the carrier is plugged into the host system device, it may not be possible to see the FRU LEDs. In such a case, when replacing a failed M.2 SSD module (i.e., FRU) on the carrier, the carrier must be removed from the system, but this removal presents an issue because, once the carrier is removed, host power is not available to the carrier and thus there is no power available to illuminate the appropriate FRU LED, for example to indicate or identify the failed M.2 SSD module (i.e., FRU). Thus when the carrier is disconnected from the host power source, the carrier would still need to provide power to the visual FRU indicator which does not rely on the presence of host power. Going forward in the present disclosure, the term FRU will be used to include M.2 SSD modules or other types of field replaceable units.

In one example, a latching relay with a visual indicator as the FRU indicator may be used. And, some latching relays may include visual indicators. However, in some cases, the latching relays are physically large and expensive and may thus be impractical for some FRU identification (ID) applications.

In another example, an alternate power source may be used to provide power to the FRU indicator(s). Examples of alternate power sources may include, but are not limited to, batteries and/or capacitors. For example, one or more batteries and/or capacitors may be employed on the carrier to provide the power required to illuminate the appropriate FRU indicator, e.g., FRU LED. In one example, to minimize cost, complexity and/or to avoid some of the challenges associated with battery technology, one or more capacitors may be used. The energy required to illuminate an LED (or several LEDs simultaneously) for a reasonable period of time (e.g., 10-30 seconds) is such that supercapacitor technology may be preferred. The capacitance of the supercapacitor may be greater than 1 Farad and according to one example, may be in the range of 1-10 Farads.

In one aspect, the FRU indicator (e.g., LED(s)) may be illuminated prior to the carrier being disconnected from the host power source. And, while the host power source is still connected, the alternate power source, e.g., one or more supercapacitor, is being charged by the host power source. Once the host power source is disconnected from the carrier, the alternate power source, e.g., one or more supercapacitors, continues to provide power to keep the FRU indicator (e.g., LED(s)) illuminated for repairs or replacement. That is, the FRU indicator is illuminated long enough for a service technician to place the carrier on a bench or table top and recognize the failed FRU from the remaining FRUs.

In one aspect (for example, depending on the power requirement and time duration needed for illumination), a significant amount of supercapacitance may be needed to provide enough energy to maintain the FRU indicator(s) (e.g., LED(s) in an illuminated state.

In one example, using the one or more supercapacitors on a continuous or near continuous basis may become impractical due to the quantity and/or size of the one more supercapacitors needed, and thus, the physical space requirement for the supercapacitors may pose as a challenge for some applications.

Figure 2:
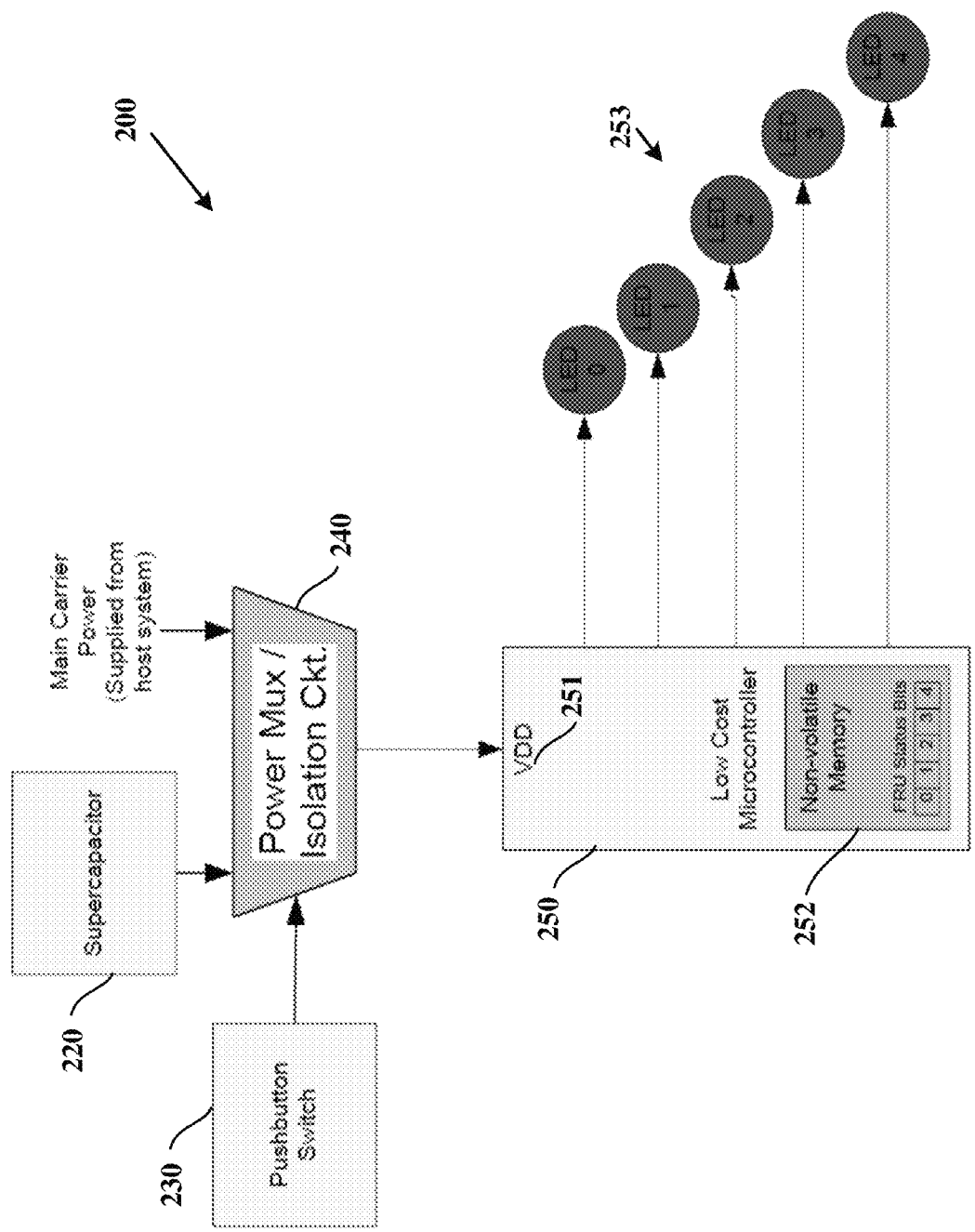
FIG. 2 illustrates an example implementation of a circuit for supporting the functionality of a pushbutton switch.

In one aspect, a pushbutton switch may be added to the carrier. When the pushbutton switch is depressed, it enables the alternate power source (e.g., the one or more supercapacitors) to energize the appropriate circuitry to illuminate the FRU LEDs. Thus, in one example, a service technician may remove the carrier from the host system device at his or her leisure, place it on a bench or tabletop, and then depress the pushbutton switch to determine which FRU is to be serviced. In this way, the amount of supercapacitance required (and, for example, the physical space for the supercapacitors) is minimized FIG. 2 illustrates an example implementation of a circuit 200 for supporting the functionality of a pushbutton switch 230. As illustrated in FIG. 2, an alternate power source 220 (which is shown as a supercapacitor) and a pushbutton switch 230 are coupled to a power multiplexer/isolation circuit 240. Also coupled to the power multiplexer/isolation circuit 240 is a main carrier power 210 (which is supplied from the host system device). Power is provided to a microcontroller 250 through a drain voltage VDD 251. The microcontroller 250 includes a non-volatile memory 252 for storing FRU status bits. And, LEDs 253 associated with corresponding FRUs are coupled to the microcontroller 250 as shown in FIG. 2. Although a microcontroller is disclosed in this example, one skilled in the art would understand that a microprocessor may also be used. Although a non-volatile memory is disclosed in this example, one skilled in the art would understand that other types of memory may be also be used.

In one aspect, during runtime, the host system device maintains status bits representing the state of each FRU in memory (e.g., non-volatile memory), for example, contained in a low cost microcontroller. The status bits for each FRU may be updated in real time. Alternatively, the status bits for each FRUS may be updated upon a detection of one or more failures in the one or more field replaceable units.

An example of a microcontroller which may be used for the purpose disclosed herein is an Atmel XMEGA microcontroller. However, one skilled in the art would understand that other types or brands of microcontroller or microprocessor (with memory) may also be used as the storage circuit and still be within the scope and spirit of the present disclosure. In the case that a failure is detected on a FRU, the host system device may update the status bits in the memory to reflect that a failure has occurred. Upon learning of the failure, the carrier with the failed FRU may be removed from the host system device. Upon the disconnection of the carrier from the host system device, the microcontroller loses power because host power has been removed from the carrier. In one example, the carrier is placed on a bench top and the alternate power source is activated. The alternative power source may be manually activated. For example, a pushbutton switch is pressed to allow the alternate power source (e.g., one or more supercapacitor) to power the failed FRU. Alternatively, the alternative power source may be automatically activated. In one example, the supercapacitor power is passed to the microcontroller via a power multiplexer/isolation circuit as indicated with the arrows shown in FIG. 2. In one example, the power multiplexer/isolation circuit is implemented using metal oxide semiconductor field effect transistor (MOSFET) technology.

Once connected to the alternate power source (e.g., one or more supercapacitor), the microcontroller powers up, reads the state of the FRU status bits contained in its memory (e.g., non-volatile memory), and drives the FRU indicator (e.g., LED indicator) associated with the failed FRU to the appropriate state of illumination. One skilled in the art would understand that although the present disclosure presents a particular circuit implementation, other circuit implementations may be used within the spirit and scope of the present disclosure.

Figure 3:
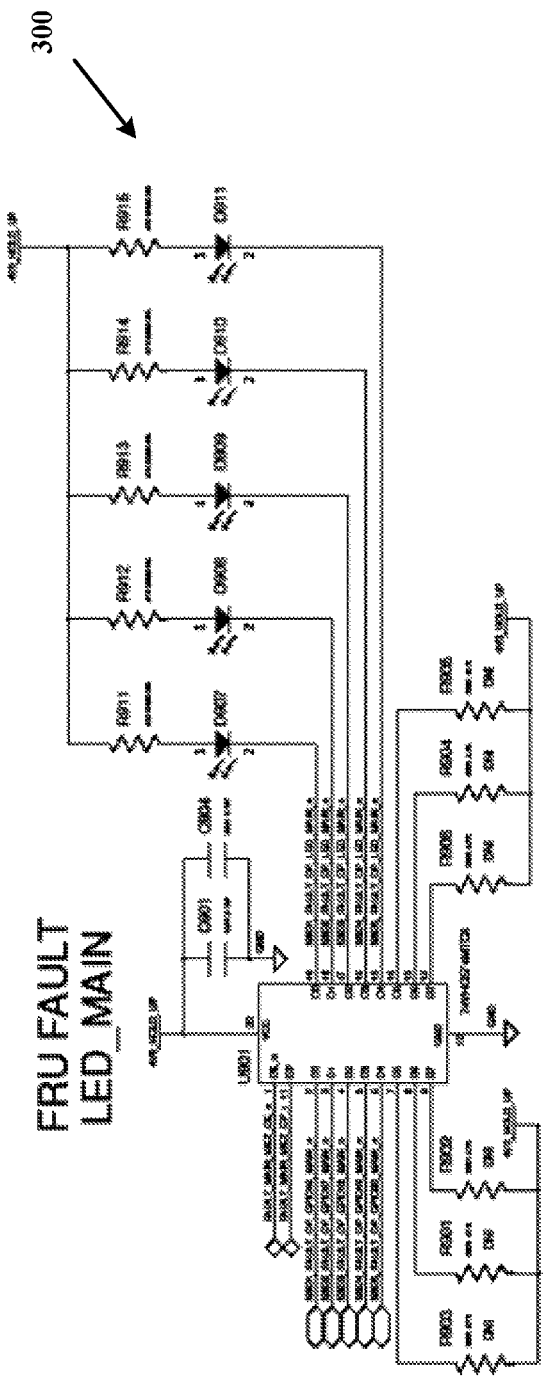
FIG. 3 illustrates an example circuit for retaining the state of field replacement unit (FRU) status bits.
Figure 3:
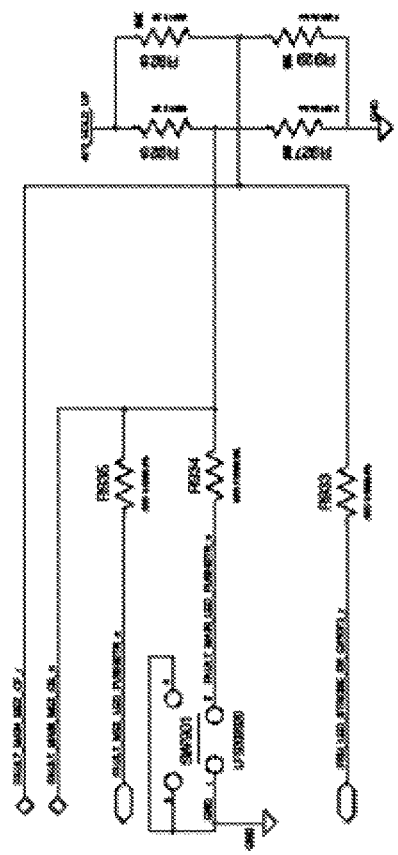

FIG. 3 illustrates an example circuit 300 for retaining the state of FRU status bits. In one aspect, the circuit illustrated in FIG. 3 may be used to retain the state of FRU status bits instead of using a microcontroller with non-volatile memory to retain the state of FRU status bits when the carrier is removed from the system. The example circuit 300 is based on a simple transparent latch integrated circuit (IC). In one example, during runtime, the host system device maintains the FRU status bits in the latch IC. During runtime, the latch IC receives main carrier power. When the carrier is removed from the host system device, power to the latch IC is then provided by the alternate power source (e.g., one or more supercapacitors) such that the state of the FRU status bits are retained after host power is lost. To minimize the amount of supercapacitance required, a pushbutton switch may be used to direct additional supercapacitor power for illuminating the FRU indicator(s) (e.g., LED indicator(s)). In this example, before the pushbutton switch is pressed, the only drain on the alternate power source (e.g., one or more supercapacitors) is from the latch IC for retaining the FRU status bits. In one example, the circuit 300 (shown in FIG. 3) working in conjunction with a pushbutton switch may be used for implementing retaining the state of FRU status bits and for illuminating the FRU indicator(s) (e.g., LED indicator(s)).

In one example, the circuit shown in FIG. 3 has a lower cost than a microcontroller based circuit. In one example, the latch IC continuously draws power from the alternate power source (e.g., one or more supercapacitor) to retain the FRU status bits after the carrier is removed from the host system device. With a continuous power draw, the FRU status information may eventually be lost once the alternate power source (e.g., one or more supercapacitor) drains completely. In another example, with the implementation of a microcontroller circuit, the FRU status information may be retained for a long time (e.g., for years) in non-volatile memory.

In another example, a pushbutton switch may activate the alternate power source to power a microcontroller-based circuit comprising a non-volatile memory for storing the status bits. Upon being powered by the alternate power source, the microcontroller-based circuit asserts the appropriate LED control signal to illuminate the appropriate indicator of the failed field replaceable unit (FRU). One advantage of this approach versus the latch approach is that the static current drain from the alternate power source (e.g., one or more supercapacitors) is much lower before the pushbutton switch is pressed.

Figure 4:
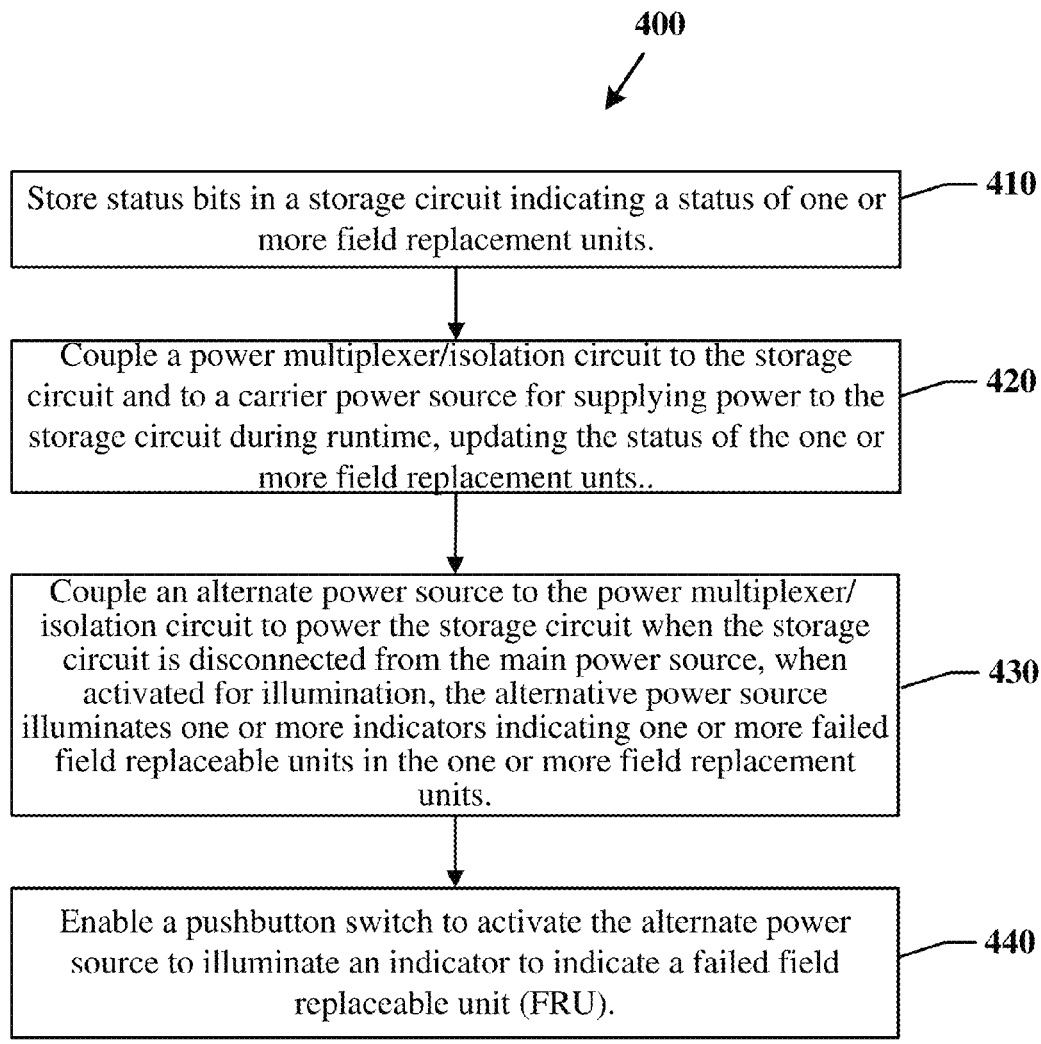
FIG. 4 is an example flow diagram for visual field replacement unit (FRU) identification.

FIG. 4 is an example flow diagram 400 for visual field replacement unit (FRU) identification. In block 410, store status bits in a storage circuit indicating a status of one or more field replacement units. In block 420, couple a power multiplexer/isolation circuit to the storage circuit and to a main carrier power source for supplying power to the storage circuit during runtime, updating the status of the one or more field replacement units. In block 430, an alternate power source may be coupled to the power multiplexer/isolation circuit to power the storage circuit when the storage circuit is disconnected from the main carrier power source, wherein when activated for illumination, the alternative power source illuminates one or more indicators indicating one or more failed field replacement units in the one or more field replacement units. In block 440, enable a pushbutton switch to activate the alternate power source to illuminate an indicator to indicate or identify a failed field replaceable unit (FRU).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one " a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

The invention claimed is:

1. A device for visual field replacement unit identification, comprising:
   a storage circuit, the storage circuit stores status bits indicating a status of each field replacement unit in a plurality of field replacement units;
   a power multiplexer/isolation circuit coupled to the storage circuit and a main power source for supplying power to the storage circuit during runtime updating the status of the each field replacement unit in the plurality of field replacement units; and
   an alternate power source coupled to the power multiplexer/isolation circuit to power the storage circuit when the storage circuit is disconnected from the main power source, wherein when activated for illumination, the alternate power source illuminates one or more indicators of one or more failed field replaceable units in the plurality of field replacement units.

2. The device of claim 1, wherein the alternate power circuit includes one or more supercapacitors having a capacitance in a range of 1-10 Farads.

3. The device of claim 2, wherein the storage circuit is a microcontroller-based circuit having a non-volatile memory; and wherein the plurality of field replacement units are located on one or more carrier printed circuit board assemblies.

4. The device of claim 3, further comprising a pushbutton switch for activating the alternate power source to power the microcontroller-based circuit to assert a control signal to illuminate the one or more indicators of the one or more failed field replaceable units.

5. The device of claim 4, further comprising a pushbutton switch for activating the alternate power source to illuminate the one or more indicators to identify the one or more failed field replaceable units; and wherein the storage circuit is a latch integrated circuit (IC).

6. The device of claim 1, wherein the status of the each field replacement unit in the plurality of field replacement units is updated in real time.

7. The device of claim 1, wherein the status of the each field replacement unit in the plurality of field replacement units is updated upon a detection of a failure in at least one field replaceable unit in the plurality of field replaceable units.

8. A method, operational on a host system device, for visual field replacement unit identification, comprising:
   storing status bits in a storage circuit indicating a status of one or more field replacement units;
   coupling a power multiplexer/isolation circuit to the storage circuit and a main power source for supplying power to the storage circuit during runtime, updating the status of the one or more field replacements units; and
   coupling an alternate power source to the power multiplexer/isolation circuit to power the storage circuit when the storage circuit is disconnected from the main power source, wherein when activated for illumination, the alternate power source illuminates one or more indicators indicating one or more failed field replaceable units in the one or more field replacement units.

9. The method of claim 8, wherein the alternate power circuit includes one or more supercapacitors having a capacitance in a range of 1-10 Farads.

10. The method of claim 9, wherein the storage circuit is a microcontroller-based circuit having a non-volatile memory, the non-volatile memory stores the status bits; and wherein the one or more field replacement units are located on one or more carrier printed circuit board assemblies.

11. The method of claim 10, further comprising enabling a pushbutton switch to activate the alternate power source to power the microcontroller-based circuit to assert a control signal to illuminate the one or more indicators of the one or more failed field replaceable units in the one or more field replaceable units.

12. The method of claim 8, wherein the status of the one or more field replacement units is updated in real time.

13. The method of claim 8, wherein the status of the one or more field replaceable units is updated upon a detection of one or more failures in the one or more field replaceable units.

14. A host system device comprising:
   one or more field replaceable units powered by a host power source, each field replaceable unit including:
   a storage circuit for storing status information associated with the one or more field replaceable units;
   an on-board backup power source to power the storage circuit when the storage circuit is disconnected from the host power source; and
   a circuit powered by the on-board backup power source and adapted to provide one or more visual indicators of status information stored in the storage circuit.

15. The host system device of claim 14, wherein the one or more visual indicators are provided as one or more light emitting diodes; and wherein the one or more field replaceable units are removably coupled to the host system device.

16. The host system device of claim 14, wherein the storage circuit is non-volatile storage; and wherein the one or more field replacement units are located on one or more carrier printed circuit board assemblies.

17. The host system device of claim 14, wherein at least one of the one or more field replaceable units includes one or more non-volatile storage devices, and the status information stored in the storage circuit corresponds to the status of the one or more non-volatile storage devices.

18. The host system device of claim 14, wherein the status information includes at least one of a device failure, a device usage, and errors for the one or more non-volatile storage devices.

19. The host system device of claim 14, wherein the circuit operates while the one or more field replaceable units are removed from the host system device.

20. The host system device of claim 14, wherein the circuit is activated and powered from the on-board backup power source by manual activation.

* * * * *